(12) United States Patent
Glück et al.

(10) Patent No.: US 6,254,949 B1
(45) Date of Patent: Jul. 3, 2001

(54) THERMOPLASTIC SHAPED BODIES WITH SEGMENTS OF VARYING RIGIDITY

(75) Inventors: Alexander Glück, Freinsheim; Walter Götz, Ludwigshafen; Volker Lohrbächer, Weinheim; Graham Edmund Mc Kee, Neustadt; Mark Völkel, Ladenburg, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/402,540

(22) PCT Filed: Apr. 7, 1998

(86) PCT No.: PCT/EP98/02022

§ 371 Date: Oct. 6, 1999

§ 102(e) Date: Oct. 6, 1999

(87) PCT Pub. No.: WO98/46681

PCT Pub. Date: Oct. 22, 1998

(30) Foreign Application Priority Data

Apr. 11, 1997 (DE) .............................. 197 15 120

(51) Int. Cl.⁷ .......................... B29D 22/00; B29D 23/00; B32B 1/08
(52) U.S. Cl. ................. 428/36.91; 138/118; 138/121; 138/137; 428/474.9
(58) Field of Search .............. 428/36.91, 974.9; 138/121, 118, 137

(56) References Cited

U.S. PATENT DOCUMENTS

| 5,154,979 | 10/1992 | Kerschbaumer et al. | 428/476 |
|---|---|---|---|
| 5,156,796 | 10/1992 | Makagawa et al. | 264/514 |
| 5,362,530 | * 11/1994 | Kitami et al. | 428/36.2 |
| 5,474,822 | * 12/1995 | Röber et al. | 428/36.91 |
| 5,560,398 | 10/1996 | Pfleger | 138/121 |
| 5,588,468 | 12/1996 | Pfleger | 138/121 |
| 5,863,643 | * 1/1999 | von Widdern et al. | 428/220 |

FOREIGN PATENT DOCUMENTS

| 3718605 | 12/1987 | (DE) . |
|---|---|---|
| 383409 | 10/1990 | (EP) . |
| 659534 | 6/1995 | (EP) . |
| 659535 | 6/1995 | (EP) . |

* cited by examiner

*Primary Examiner*—Ana Woodward
(74) *Attorney, Agent, or Firm*—Keil & Weinkauf

(57) ABSTRACT

The shaped article consists of
a) from 5 to 95% by weight of a molding composition A made from at least one thermoplastic polyamide, copolyamide or blends of these as component A1, fillers and/or reinforcing materials, if desired, as component A2, impact modifiers as component A3 and other additives and processing aids as component A4, and
b) from 5 to 95% by weight of a molding composition B, made from at least one thermoplastic polyamide, copolyamide or blends of these as component B1, at least one crosslinked elastomeric polymer as component B2 and, if desired, other additives and processing aids as component B3, where, in the shaped article, segments of molding compositions A and B are connected to one another over a relatively large area. These shaped articles may be used in the motor vehicle sector, for example as air or coolant ducts.

11 Claims, No Drawings

THERMOPLASTIC SHAPED BODIES WITH SEGMENTS OF VARYING RIGIDITY

The invention relates to thermoplastic shaped articles, in particular hollow shaped articles, composed of hard and soft segments, processes for producing them by injection molding, extrusion and extrusion blow molding and the use of molding compositions A and B for producing the shaped articles.

Nowadays, blow molding is very widely used for producing hollow shaped articles. For this process, the tube is extruded into the opened mold and expanded, and the mold is then closed. Portions of the plastic material which extend beyond the required shape are pinched off and, after demolding, are removed as flash, which has to be recycled. The resultant moldings have an encircling pinch-off line, and this is a point of weakness.

Nowadays, 3-dimensional blow molding provides an advanced process for producing moldings of complicated geometry which have no pinch-off line. In contrast to the process described above, protruding portions of the plastic material which must be pinched off and removed as flash arise only at the two ends of the tube or parison. This process also avoids the formation of longitudinal pinch-off lines and is described, for example, in DE-A 37 18 605.

To produce moldings having a combination of materials which alternate in the longitudinal direction, it is advantageous to combine this process with sequential coextrusion. For this, the extrusion die is fed alternately from a number of extruders with different materials during extrusion of the parison, giving a tube having segments of differing construction and material properties. By this means it is possible, for example, to produce in a single operation blow moldings having flexible end zones and a rigid middle section. Until now, parts of this type had to be produced by complicated assembly of many sections.

For coextrusion, good adhesion of the components to one another is necessary. It is therefore advantageous not to switch completely from one component to the other, but just to vary the wall thickness ratio so that in every region of the molding there are layers of both components. The two components are thus mutually connected over a relatively large area and this improves their adhesion.

A further requirement for good adhesion is good compatibility of the components with one another.

Moldings having alternating property combinations are used in automotive construction and mechanical engineering. It is possible, for example, to accommodate within a pipe, a charge-air pipe for a turbodiesel engine for a vehicle, for example, segments for damping and heat expansion. For many applications moreover, the parts must have good heat resistance and good chemical resistance, for example to resist contamination by oil, and therefore both components must have these properties, since the performance of a part composed of a number of components is limited by its weakest component.

EP-B 0 393 409 describes shaped articles composed of a number of sections which are connected via limited areas of contact, the subsections consisting of, respectively, a polyolefin-modified polyamide (a polyamide mixed with a polyolefin functionalized with carboxyl or anhydride groups) and of a polyolefin. The sections are connected by injection-molding or extruding one component onto a hardened subsection composed of the other component. The adhesion of the, per se incompatible, polymers of the subsections of the shaped article is attributable to the compatibilizing effect of the functionalized polyolefin.

EP-A 0 659 534 discloses sequentially extruded coolant pipes having an outer layer of high bursting strength and an inner layer which is inert to coolants and does not swell, the outer layer consisting of a polyamide and the inner or intermediate layer, which is compatible with the outer layer, consisting of polyolefins modified with carboxyl or anhydride groups.

According to EP-A 0 659 535, these coolant pipes may be produced by extrusion blow molding combined with 3D manipulation of the parison.

A disadvantage with these moldings is the use of layers of polyolefin components having comparatively low heat resistance. It is an object of the present invention to provide thermoplastic moldings having alternating hard/soft segments, where the soft segments, besides high flexibility, also have in particular high chemical resistance and heat resistance, and where there is also good adhesion to a hard segment consisting essentially of polyamide. It is a further object of the invention to provide moldings having segments of differing stiffness composed of components connected to one another over a relatively large area, where each of the components has high heat resistance and high heat aging resistance, high long-term service temperature, high chemical resistance, in particular high resistance to oil, fuel and coolants, and high tensile and/or bursting strength.

We have found that this object is achieved by means of shaped articles composed of a) from 5 to 95% by weight of a molding composition A composed of
   a1) from 40 to 100% by weight of at least one thermoplastic polyamide, copolyamide or blends of these as component A1,
   a2) from 0 to 60% by weight of fillers and/or reinforcing materials as component A2,
   a3) from 0 to 20% by weight of impact modifiers as component A3 and
   a4) from 0 to 30% by weight of other additives and processing aids as component A4,
   where the total of the amounts of components A1 and, if used, A2 to A4, is 100% by weight,
b) from 5 to 95% by weight of a molding composition B composed of
   b1) from 20 to 79.9% by weight of at least one thermoplastic polyamide, copolyamide or blends of these as component B1,
   b2) from 20.1 to 80% by weight of at least one crosslinked elastomeric polymer as component B2 and
   b3) from 0 to 30% by weight of other additives and processing aids as component B3,
where the total of the amounts of components B1, B2 and, if used, B3 is 100% by weight,
where, in the shaped article, segments of the molding compositions A and B are connected to one another over a relatively large area.

It has been found that when a highly crosslinked elastomeric polymer is used in a mixture with a polyamide, even when there is a high proportion of the elastomeric polymer in the mixture, the continuous phase is formed by the polyamide. The polymer proportion results in a soft component (molding composition B) which also has the properties of the polyamide, in particular high heat resistance, chemical resistance, tensile and bursting strength, and at the same time is compatible with the hard component (molding composition A) composed of polyamide.

Molding Composition A

Molding composition A is built up from a1) from 40 to 100% by weight of at least one thermoplastic polyamide, copolyamide or blends of these as component A1, a2) from 0 to 60% by weight of fillers and/or reinforcing materials as component A2, a3) from 0 to 20% by weight of impact modifiers as component A3 and a4) from 0 to 30% by weight of other additives and processing aids as component A4, where the total of the amounts of components A1 and, if used, A2 to A4, is 100% by weight.

The molding compositions A comprise, as component A1, from 40 to 100% by weight, preferably from 70 to 100% by weight, particularly preferably from 85 to 100% by weight, of a thermoplastic polyamide, copolyamide or blends of these.

The polyamides which may be used are known per se. Examples of these are polyhexamethylene adipamide, polyhexamethylene pimelamide, polyhexamethylene suberamide, polyhexamethylene azelamide, polyhexamethylene sebacamide, polyhexamethylene dodecanediamide, polyoctamethylene suberamide, polydodecamethylene dodecanediamide, poly-11-aminoundecanamide and bis-(4-aminocyclohexyl)methanedodecanamide or the products obtained by ring-opening of lactams, eg. polycaprolactam or polylaurolactam. Other suitable polyamides are those based on terephthalic or isophthalic acid as acid component and/or trimethylhexamethylenediamine, bis(4-aminocyclohexyl)methane or 2,2-di(4-aminocyclohexyl)propane as diamine component and polyamide base resins prepared by copolymerizing two or more of the abovementioned polymers or their components, for example copolycondensates of terephthalic acid, hexamethylenediamine and caprolactam (nylon-6,T/6), and of terephthalic acid, isophthalic acid, adipic acid and hexamethylenediamine (nylon-6,T/6,I), which may also be built up as ternary copolycondensates with other polyamide-forming monomers: eg. with adipic acid (nylon-6,I/6,T/6,6) or with alicyclic diamines, such as bis(4-aminocyclohexyl)methane or bis(4-amino-3-methylcyclohexyl)methane.

Use is preferably made of partially crystalline polyamides, preferentially nylon-6, nylon-6,6, nylon-6,T/6, nylon-6/6,T, nylon-6,T/6,1, nylon-6,T/6,6, nylon-6,T/6,I/6,6, nylon-6,6/6,T (copolycondensates of hexamethylenediamine, adipic acid, caprolactam and iso- and/or terephthalic acid) and nylon-4,6. It is also possible to use mixtures of different polyamides. It is particularly preferable to use nylon-6,6 and nylon-6, in particular nylon- 6.

In one embodiment of the invention, the viscosity number of component A1 is from 130 to 500, preferably from 140 to 400. The viscosity numbers are usually determined according to ISO 307 using 0.5% strength by weight solutions in 96% strength by weight sulfuric acid at 25° C.

The molding composition A may contain, as component A2, up to 60% by weight, preferably from 10 to 30% by weight, particularly preferably from 10 to 20% by weight, of a filler or reinforcing material. Preference is given to fibrous reinforcing materials, such as glass fibers, carbon fibers, aramid fibers and potassium titanate fibers. Glass fibers, in particular glass fibers of E glass, are particularly preferred.

Other substances which may be present as component A2, alone or in a mixture with the fibrous reinforcing materials mentioned, are mineral fillers, such as wollastonite, kaolin, quartz, mica and calcium carbonate.

The fillers and/or reinforcing materials are preferably treated with a coupling agent, such as alkylaminoalkoxysilane. In a particularly preferred embodiment of the invention, component A2 consists exclusively of glass fibers.

The molding composition A may contain, as component A3, up to 20% by weight of impact modifiers. Impact modifiers are polyolefins which have been grafted with reactive groups, and are known per se. Examples of suitable impact modifiers are described in U.S. Pat. No. 4,174,358, column 6, line 21 to column 7, line 26.

The molding composition A may contain, as component A4, up to 30% by weight of other additives and processing aids. The proportion of these is preferably up to 10% by weight, based on the total weight of component A.

Examples of usual additives are stabilizers and oxidation inhibitors, heat stabilizers and UV stabilizers, lubricants, mold-release agents, dyes, pigments and flame retardants.

Examples of oxidation inhibitors and heat stabilizers which may be added to the thermoplastic molding compositions according to the invention are halides selected from the group consisting of metals in group I of the Periodic Table, such as lithium halides, sodium halides, potassium halides and copper(I) halides, for example chlorides, bromides and iodides, or mixtures of these. It is also possible to use sterically hindered phenols, secondary aromatic amines, hydroquinones, substituted representatives of this group and mixtures of these compounds, preferably in concentrations of up to 1% by weight, based on the weight of the mixture.

Examples of UV stabilizers are substituted resorcinols, sterically hindered phenols, salicylates, benzotriazoles and benzophenones, which can generally be used in amounts of up to 2% by weight.

Examples of lubricants and mold-release agents, which generally can be added to the thermoplastic molding compositions in amounts of up to 1% by weight, are long-chain fatty acids or their derivatives, such as stearic acid, stearyl alcohol, alkyl stearates and stearamides and pentaerythritol esters of long-chain fatty acids.

Examples of flame retardants are red and black phosphorus, or a phosphorus-containing compound, in amounts of from 3 to 10% by weight. A preferred flame retardant is elemental phosphorus, in particular in combination with glass-fiber-reinforced molding compositions.

Other preferred flame retardants are organic phosphorus compounds, such as the esters of phosphoric acid, of phosphorous acid, of phosphonic acid and of phosphinic acid, and tertiary phosphines and phosphine oxides, for example triphenylphosphine oxide. This may be used alone or mixed with hexabromobenzene or with a chlorinated biphenyl and, if desired, antimony trioxide.

Other suitable flame retardants are compounds which contain phosphorus-nitrogen bonds, for example phosphonitrile chloride, phosphoric ester amides, phosphinic amides, tris(aziridinyl)phosphine oxide and tetrakis(hydroxymethyl) phosphonium chloride.

Organic dyes, such as nigrosin, pigments, such as titanium dioxide, cadmium sulfide, cadmium selenide, phthalocyanines, ultramarine blue and carbon black may also be added as colorants.

Nucleating agents which may be used are sodium phenylphosphinate, alumina, silica, nylon-2,2 and, preferably, talc, usually in amounts of up to 1% by weight.

Component A preferably has a tensile modulus >2000 MPa, particularly preferably >2800 MPa, in particular >3500 MPa. The tensile modulus is determined here according to ISO 527 on single-component tensile specimens.

Molding Composition B

Molding composition B is built up from

B1) from 20 to 79.9% by weight of at least one thermoplastic polyamide, copolyamide or blends of these, as component B1, B2) from 20.1 to 80% by weight of at least one crosslinked elastomeric polymer as component B2 and B3) from 0 to 30% by weight of other additives and processing aids as component B3, where the total of the amounts of components B1, B2 and, if desired, B3 is 100% by weight.

The molding composition B contains, as component B1, from 20 to 79.9% by weight, preferably from 20 to 70% by weight, particularly preferably from 25 to 55% by weight, in particular from 30 to 45% by weight, of at least one thermoplastic polyamide, copolyamide or blend of these. The polyamides used may be those which are also used as component A1 in the molding composition A, particular preference again being given here to nylon-6,6 and nylon-6, especially nylon-6.

The molding composition B contains, as component B2, from 20.1 to 80% by weight, preferably from 30 to 80% by weight, particularly preferably from 45 to 75% by weight, in particular from 55 to 70% by weight, of at least one crosslinked elastomeric polymer.

The component B2 forms the disperse phase.

The molding composition B may contain, as component B3, up to 30% by weight, preferably up to 10% by weight, of other additives and processing aids. It is possible to use the additives and processing aids which are also present as component A4 in the molding composition A.

The Vicat softening point of the molding composition B, determined according to ISO 306, method B, is preferably >180° C., particularly preferably >200° C.

The tensile modulus of the molding composition B is generally from 50 to 1500 MPa, preferably from 200 to 1000 MPa, particularly preferably from 350 to 800 MPa.

Preferred crosslinked elastomeric polymers B2 are graft copolymers of

B21) from 50 to 97.9% by weight, preferably from 75 to 95.5% by weight, particularly preferably from 85 to 95% by weight, of at least one olefinically unsaturated monomer as component B21, B22) from 2 to 50% by weight, preferably from 4 to 25% by weight, particularly preferably from 8 to 15% by weight, of at least one polyfunctional crosslinking monomer as component B22 and B23) from 0.1 to 10% by weight, preferably from 0.5 to 5% by weight, particularly preferably from 1 to 3% by weight, of at least one olefinically unsaturated monomer having a group which is reactive to polyamide, as component B23.

Suitable olefinically unsaturated monomers for component B21 are $C_{1-10}$-alkyl (meth)acrylates, preferably $C_{1-8}$-alkyl (meth)acrylates, particularly preferably n-butyl acrylate and/or ethylhexyl acrylate.

The crosslinking monomers B22 are polyfunctional monomers having at least two ethylenically unsaturated groups. Of these, preference is given to polyfunctional, in particular difunctional compounds having non-conjugated double bonds, for example divinylbenzene, diallyl fumarate, diallyl maleate, diallyl phthalate, triallyl cyanurate, triallyl isocyanurate, tricyclodecenyl acrylate and dihydrodicyclopentadienyl acrylate, of which the last two are particularly preferred.

Particularly suitable olefinically unsaturated monomers B23 having a group reactive to polyamide are acrylic acid, methacrylic acid, maleic acid, maleic anhydride, fumaric acid and glycidyl methacrylate, in particular acrylic acid and methacrylic acid.

The elastomeric polymer is preferably a core-shell polymer, ie. a polymer built up from a core (graft base) and one or more shells (graft). The graft base preferably has only components B21 and B22, and component B23, which has groups reactive to polyamide, is present only in the shell. This structure ensures that the groups which bring about adhesion to component B1 are present also at the surface of the polymer particles.

In a preferred embodiment of the invention, crosslinked acrylate polymers having a glass transition temperature of below 0° C., preferably below −20° C., in particular below −30° C., serve as graft base.

Suitable processes for preparing the graft base A1 are known per se and are described, for example, in DE-B-1 260 135. Corresponding products are also available commercially. Preparation by emulsion polymerization has proven especially advantageous.

The precise polymerization conditions, in particular the type, method of addition and amount of the emulsifier, are preferably chosen so that the latex of the acrylate, which is at least to some extent crosslinked, has a mean particle size in the range from 10 to 10 000 nm, preferably from 100 to 1000 nm. The latex preferably has a narrow particle size distribution.

The graft shell is preferably prepared in emulsion, as described, for example, in DE-B-12 60 135, DE-A-32 27 555, DE-A-31 49 357 and DE-A-34 14 118.

Shaped Articles

In a preferred embodiment of the invention, the shaped articles consist of molding compositions A and B whose tensile modulus differs by a factor of at least 2.

In a further preferred embodiment, the molding compositions A and B contain the same polyamide as components A1 and B1.

The mixing of components A1 to A4 to give molding composition A and of components B1 to B3 to give molding composition B may be carried out by known methods. The components are preferably mixed by jointly extruding or compounding them.

For this, it is expedient to use extruders, such as single-screw or twin-screw extruders, or other conventional plastication equipment, such as Brabender mixers or Banbury mixers.

The product of the graft copolymerization (component B2), which is obtained in aqueous dispersion, may, before mixing, be dried completely, for example by spray drying, and mixed as pulverulent polymer with the other components. However, as described in DE-A-33 13 919, it is also possible to use the aqueous polymer dispersion, preferably firstly plasticating the polyamide in the mixing equipment. When the polyamide melt is mixed with the polymer dispersion, the water evaporates, and the rubber particles become uniformly distributed in the melt.

Known processes, for example injection molding, extrusion or extrusion blow molding, may be used for producing the shaped articles from the molding compositions A and B.

The shaped articles may, for example, be produced by injection molding. For this, the molding compositions A or B may be molded onto, or extruded onto, a hardened section of the other molding composition in each case. The shaped articles may also be produced by two-component injection molding, with simultaneous injection of the two molding compositions A and B, preferably from opposite ends of the injection mold.

The production of shaped articles by injection molding is preferably carried out using molding compositions A and B which contain, as polyamide components A1 and B1 respectively, polyamides having a viscosity number of from 140 to 185.

The molding compositions A and B are particularly advantageously used for producing hollow shaped articles. Hollow shaped articles made from different molding compositions A and B are generally produced by coextrusion of the molding compositions A and B, the extrusion die being fed from at least two different extruders. A tube is extruded which contains both molding compositions A and B. The extruded tube may itself be the desired shaped article, such as a straight pipe, or may be a parison from which the shaped article is produced by further process steps.

In coextruding the hollow shaped article or parison, it is possible to operate with constant rates of material flow from each extruder. This gives an extruded tube which has, distributed through the thickness of the wall, a sequence of layers of identical or different thickness of, in each case, one of the molding compositions A or B, the layer thickness and the construction remaining constant over the entire length of the tube.

It is, however, more advantageous to produce the hollow shaped articles or parisons by sequential coextrusion, ie. with alternating material flows. This can be carried out by feeding the extrusion die from alternating extruders, ie. alternately solely with molding composition A or molding composition B. This gives a tube which has an alternating construction along its entire length, with segments of, in each case, only one of the molding compositions A or B. The switching from one extruder to the other may be sudden or may occur continuously within a limited period of time. In the latter case, a limited portion of the tube (in contrast to the entire length of the extruded tube) has layers of both molding compositions, the layer thickness ratio changing continuously from 100% of the molding composition A (B) to 100% of the molding composition B (A). This achieves a surface bond between the individual segments of the hollow shaped article or parison, resulting in a marked improvement in the adhesion between the segments.

In a preferred embodiment of the invention, there is no complete switching from one molding composition to the other. This gives shaped articles which have, along their entire length, both layers of, respectively, molding composition A and B; the sequence of the layers here from outside to inside may be as desired. By this means it is possible to obtain hollow shaped articles made from hard and soft segments of different layer thickness ratio. In principle, any desired ratio of layer thicknesses may be selected for each segment. The proportion of the layer of molding composition A in the wall thickness in the hard segments of the shaped articles is generally from 70 to 99.9%, preferably from 70 to 99%, particularly preferably from 80 to 95%, in particular from 85 to 90%, and in the soft segments of the shaped articles it is generally from 0.1 to 30%, preferably from 1 to 30%, particularly preferably from 5 to 20%, in particular from 10 to 15%, where in each case the proportion of the layer of molding composition B is such as to give a total of 100%. The change of layer thicknesses between the hard and soft segments is preferably not sudden, but continuous across a length which, for example, corresponds to 5 times the wall thickness.

It is also possible to extrude parisons or shaped articles which have more than just two layers; the sequence of the layers here from outside to inside may be as desired, and the thickness of the individual layers may vary. For example, the shaped articles may have a structure in which three layers have the sequence A-B-A or B-A-B. The shaped articles may also have segments having a different number of layers.

The novel shaped articles preferably have two layers.

Coextrusion may be combined with other process steps known per se for producing hollow shaped articles having shapes diverging from that of a simple tube (straight and with constant diameter along the length). The hollow shaped articles may, for example, be produced by extrusion blow molding. For this, the tube is extruded into an opened mold, the mold is closed and the tube is expanded. In the molding step, the walls of the parison are pressed by the internal gas pressure against the inner wall of the mold, and solidify.

The molding may also be carried out by firstly expanding the parison and then closing the mold. This generally gives hollow shaped articles with an encircling pinch-off line.

In producing the novel shaped articles, molding by expanding the parison is preferably carried out after closing the mold.

Hollow shaped articles of complicated shape can also be produced by combining blow molding and a technique known as 3D extrusion. For this, a tube is extruded and placed, with shaping as required by the contours of the shaped article, into the half of an opened mold. The placing of the tube may, for example, be carried out by moving the opened blowing mold under the extruder, by moving the extruder over the opened blowing mold or by manipulating the extruded tube using a grab arm. The blowing mold is then closed and the tube is expanded. The extruded tube may also be sucked into the blowing mold and expanded. Processes for 3D extrusion and/or tube manipulation are known to the person skilled in the art. The hollow shaped articles obtained have complicated shapes and no encircling pinch-off line.

The molding compositions A and B used for producing hollow shaped articles by simple (co)extrusion without subsequent blow molding preferably have, as components A1 and/or B1, polyamides having a viscosity number of from 190 to 285.

The molding compositions A and B used for producing hollow shaped articles by extrusion followed by blow molding preferably have, as components A1 and/or B1, polyamides having a viscosity number of from 250 to 400.

In a preferred embodiment of the novel process, hollow shaped articles are produced by 3D extrusion followed by blow molding. By this means it is possible to produce blow-molded parts having flexible end zones and a hard middle section. Typical applications are especially parts for automotive construction and mechanical engineering. Examples are air intake pipes or air ducts, which, for ease of assembly and end-sealing on the one hand, and adequate resistance to reduced and/or increased pressure in the middle section on the other hand, require a soft-hard-soft combination.

The novel shaped articles have the advantage that, although the stiffness of their segments differs, other properties which are significant in applications are retained along the entire length of the shaped article, ie. both in the hard and in the soft segments.

Thus, molding composition B, although it may have a high proportion of olefin polymer, has the properties typical of polyamides, such as high heat resistance and good solvent resistance, and as a result, these properties are also present in the soft segments (which have a high proportion of molding composition B). The tensile strength of component B is also comparatively high, and therefore the novel shaped articles have high bursting strength along their entire length.

It is particularly noteworthy that, in the novel shaped articles, segments of different construction and having different combinations of properties are combined without the need for intermediate layers of adhesion promoters. Intermediate layers of this type are generally undesirable, since they increase the number of transitions between materials.

Intermediate layers of the usual adhesion promoters moreover are points of weakness with respect to heat resistance and chemical resistance (solvent resistance).

It is also particularly noteworthy that the novel shaped articles have a high long-term service temperature and good resistance to heat aging. They are therefore particularly suitable for applications in the motor vehicle sector, in particular for internal use in motor vehicles, for example as pipelines for gas or liquid in the engine compartment.

In a particularly preferred embodiment of the invention, hollow shaped articles are produced in the form of air and coolant ducts for motor vehicles.

The invention is described in more detail by means of the following examples.

EXAMPLES

In the examples, use was made of two-component tensile specimens made from the molding compositions A and B and of single-component tensile specimens made from, in each case, one molding composition.

The two-component tensile specimens (thickness: 4 mm, length: 160 mm, width in the central section: 10 mm) were produced by injection-molding the molding compositions A and B at 270° C., using an Arburg two-component injection-molding machine, to give standard tensile specimens of the dimensions given in ISO 527. The tensile specimens here were injection molded with one component from each side, with the result that the dividing line between A and B fell approximately in the center of the tensile specimen. It could be seen without difficulty because of the different pigmentation of the components.

One-component tensile specimens were also injection molded from the respective components by a standard method.

The tensile strength of the two-component tensile specimens was determined; (fracture always occurred at the interface).

The tensile modulus of the single-component tensile specimens, and their ultimate tensile strength, were determined according to ISO 527, and their Vicat softening point (method B) was determined to ISO 306. Parts made from the respective molding compositions were also refluxed for 6 h in toluene, and the uptake of solvent determined. The results are given in the following table.

The molding compositions used had the following formulation:

Example 1

Molding composition A made from nylon-6 having 30% by weight of glass-fiber reinforcement, viscosity number (VN)=142 ml/g (Ultramid B3WG6 from BASF AG, Ludwigshafen, Germany)

Molding composition B made from 42% by weight of nylon-6, VN=150 (Ultramid B3 from BASF AG) and 58% by weight of a dispersion rubber made from n-butyl acrylate with 8% of dicyclopentadienyl acrylate (DCPA) as crosslinker, graft shell of methyl methacrylate with I% by weight of methacrylic acid, having a particle size of 0.1 μm, compounded at 280° C. using a twin-screw extruder (ZSK 30 from Werner & Pfleiderer) at 200 rpm and a throughput of 12 kg/h.

Example 2 as Example 1, but molding composition A made from nylon-6 reinforced with 15% by weight of glass fibers, VN=175 mug (Ultramid B35WG3 from BASF AG)

Example 3 as Example 1, but molding composition A made from unreinforced nylon-6, VN=180 ml/g (Ultramid B35W from BASF AG)

Example 4

Molding composition A made from unreinforced nylon-6, VN=330 ml/g (Ultramid B6W from BASF AG)

Molding composition B made from 42% by weight of nylon-6, VN=250 (Ultramid B4 from BASF AG) and 58% of the dispersion rubber of Example 1

Example 5 as Example 4, but molding composition B made from 35% by weight of the polyamide and 65% by weight of the dispersion rubber

Example 6 as Example 4, but molding composition B made from 55% by weight of the polyamide and 45% by weight of the dispersion rubber

Example 7 as Example 4, but molding composition B made from 70% by weight of the polyamide and 30% by weight of the dispersion rubber

Example 8 as Example 4, but molding composition A made from nylon-6 reinforced with 20% by weight of glass fibers, VN=300 (Ultramid KR 4465 G4 from BASF AG)

Comparative Example C 1 as Example 4, but molding composition B made from 90% by weight of the polyamide and 10% by weight of the dispersion rubber

Comparative Example C 2 as Example 4, but molding composition B made from 42% by weight of the polyamide and 58% by weight of a dispersion rubber which is not crosslinked and whose core is of 100% by weight of n-butyl acrylate, and whose shell is of 99% by weight of n-butyl acrylate and 1% by weight of methacrylic acid.

Comparative Example C 3 as Example 4, but molding composition B made from 42% by weight of the polyamide and 58% by weight of an ethylene-propylene copolymer having 30% by weight of ethylene, grafted with 0.8% by weight of maleic anhydride (Exxelor VA 1803 from EXXON Chemicals) as soft polymer

Comparative Example C 4 as Comparative Example C 2, but molding composition B made from 70% by weight of the polyamide and 30% by weight of the soft polymer

Comparative Example C 5 as Example 4, but molding composition B made from 42% by weight of the polyamide and 58% by weight of a copolymer of 63% by weight of ethylene, 35% by weight of butyl acrylate and 2% by weight of acrylic acid (Lotader 4700 from Atochem) as soft polymer Comparative Example C 6
as Comparative Example C 4, but molding composition B made from 70% by weight of the polyamide and 30% by weight of the soft polymer Example 10

A modified two-component blow-molding system having two 90 mm extruders and one 45 mm extruder was operated

TABLE 1

| Ex. | Tensile modulus molding comp. A | Tensile strength molding comp. A | Tensile modulus molding comp. B. | Tensile strength molding comp. B | 2-component tensile strength | VSP (method B) molding comp. A | VSP (method B) molding comp. B | Solvent uptake molding comp. A | Solvent uptake molding comp. B |
|---|---|---|---|---|---|---|---|---|---|
| 1  | 8000 | 185 | 800  | 35 | 32 | 225 | 195 | <1% | 11.5 |
| 2  | 4800 | 155 | 800  | 35 | 32 | 225 | 195 | <1% | 11.5 |
| 3  | 3050 | 90  | 800  | 35 | 33 | 219 | 195 | <1% | 11.5 |
| 4  | 2950 | 85  | 800  | 35 | 33 | 219 | 195 | <1% | 11.5 |
| 5  | 2950 | 85  | 620  | 30 | 29 | 219 | 185 | <1% | 14.0 |
| 6  | 2950 | 85  | 1145 | 41 | 36 | 219 | 201 | <1% | 10.0 |
| 7  | 2950 | 85  | 1450 | 50 | 48 | 219 | 205 | <1% | 7.9 |
| 8  | 5000 | 160 | 800  | 35 | 30 | 225 | 195 | <1% | 11.5 |
| C1 | 2950 | 85  | 2480 | 57 | 55 | 219 | 212 | <1% | 2.9 |
| C2 | 2950 | 85  | 245  | 12 | 10 | 219 | 212 | <1% | destroyed |
| C3 | 2950 | 85  | 200  | 10 | 8  | 219 | 65  | <1% | destroyed |
| C4 | 2950 | 85  | 1370 | 55 | 50 | 219 | 179 | <1% | 12.0 |
| C5 | 2950 | 85  | 250  | 10 | 10 | 219 | 59  | <1% | destroyed |
| C6 | 2950 | 85  | 1410 | 58 | 52 | 219 | 182 | <1% | 11.0 |

VSP = Vicat softening point with, on one of the 90 mm extruders, a molding composition A made from nylon-6, VN=310 ml/g (Ultramid B6W from BASF AG), and, on the second 90 mm extruder, a molding composition B made from a compounded mixture of 42% by weight of nylon-6, VN 285 (Ultramid B4 from BASF AG) and 58% by weight of a dispersion rubber made from n-butyl acrylate with 4% of crosslinker, graft shell made from methyl methacrylate with 1% by weight of methacrylic acid (Paraloid 3387 from Rohm & Haas); the 45 mm extruder was not in operation. By modifying the control arrangements, the throughput of the two extruders could be switched between the operating conditions:
Operating
condition 1: Extruder 1=54 kg/h, Extruder 2=6 kg/h
Operating
condition 2: Extruder 1=6 kg/h, Extruder 2=54 kg/h The total throughput was 60 kg/h and the processing temperature in both extruders was 250° C. The output was a 1500 mn tube having an outer layer of the molding composition A and an inner layer of the molding composition B, and this was expanded to give a straight, rectangular hollow shaped article of 120 mm×120 mm cross section and 720 mm length. The wall thickness was from 3 to 5 mm. Hard segments made from 90% by weight of molding composition A (outside) and 10% of molding composition B (inside) were extruded at the start and at the end of the tube, and in the middle a soft segment, 150 mm in length, made from 10% by weight of the molding composition A (outside) and 90% by weight of the molding composition B (inside). Each transition between the two layer thickness distributions occurred over a longitudinal section of at least 20 mm.

Example 11 as Example 10, but with a molding composition A made from nylon-6, reinforced with 20% by weight of glass fibers, VN=300 (Ultramid KR 4465 G4 from BASF AG)

The hollow shaped articles obtained had uniform surfaces and good adhesion between the segments.

We claim:

1. A hollow shaped article having hard and soft segments made from
   a) from 5 to 95% by weight of a molding composition A composed of
      a1) from 40 to 100% by weight of at least one thermoplastic polyamide, copolyamide or blends of these as component A1,
      a2) from 0 to 60% by weight of fillers and/or reinforcing materials as component A2,
      a3) from 0 to 20% by weight of impact modifiers as component A3 and
      a4) from 0 to 30% by weight of other additives and processing aids as component A4,
   where the total of the amounts of component A1 and, if used, A2 to A4, is 100% by weight,
   b) from 5 to 95% by weight of a molding composition B composed of
      b1) from 20 to 70% by weight of at least one thermoplastic polyamide, copolyamide or blends of these as component B1,
      b2) from 30 to 80% by weight of at least one crosslinked elastomeric polymer as component B2 and
      b3) from 0 to 30% by weight of other additives and processing aids as component B3,
   where the total of the amounts of components B1, B2 and, if used, B3 is 100% by weight,
   wherein the wall of the hollow shaped article has a sequence of layers of the molding compositions A and B from outside to inside,
   wherein the proportion of the layer of molding composition A in the wall thickness in the hard segments is from 70 to 99.9% and in the soft segments is from 0.1 to 30%, where in each case the proportion of the layer of molding composition B is such as to give a total of 100%.

2. The hollow shaped article of claim 1, where the molding composition A has one or more of the following features:

component A1 comprises nylon-6 and/or -6,6, component A2 consists of glass fibers, component A4 comprises heat stabilizers, the viscosity number of component A1 is from 130 to 500, the tensile modulus of molding composition A is >2000 MPa.

3. The hollow shaped article of claim 1, where the molding composition B has one or more of the following features:

component B1 comprises nylon-6 and/or -6,6, component B3 comprises heat stabilizers, the tensile modulus of molding composition B is from 50 to 1500 MPa, the Vicat softening point (method B) of molding composition B is >180° C.

4. The hollow shaped article of claim 1, wherein emulsion copolymers of b21) from 50 to 97.9% by weight of at least one $C_{1-8}$-alkyl acrylate, as component B21, b22) from 2 to 50% by weight of at least one polyfunctional crosslinking monomer having at least two ethylenically unsaturated groups, as component B22 and b23) from 0.1 to 10% by weight of at least one olefinically unsaturated monomer having a group which is reactive to polyamide, selected from the group consisting of acrylic acid, methacrylic acid, maleic acid, maleic anhydride, fumaric acid and glycidyl methacrylate, as component B23, where the sum of the amounts of components B21, B22 and B23 is 100% by weight, having one or more of the features:

B2 is a core-shell polymer, the reactive groups are present only in the shell, the glass transition temperature of the core is <0° C., the particle size is from 0.01 to 10 $\mu$m are used as component B2.

5. The hollow shaped article of claim 1, having at least one of the features:

the tensile modulus of molding compositions A and B differ by a factor of at least 2 and molding compositions A and B comprise the same polyamide.

6. The hollow shaped article of claim 1 in the form of an air coolant duct for motor vehicles.

7. The hollow shaped article of claim 1, wherein the wall of the hollow article has, at least to some extent, a sequence of layers of the molding compositions A and B from outside to inside, the sequence from outside to inside being A-B and/or B-A.

8. The hollow shaped article of claim 1, wherein molding composition A is composed of from 10 to 60% by weight of fillers and/or reinforcing materials as component A2.

9. A process for producing a hollow shaped article from molding compositions A and B, as the are defined in claim 1, by co-extrusion, where components A1 and B1 have a viscosity number of from 190 to 285, or co-extrusion blow molding, where components A1 and B1 have a viscosity number of from 250 to 400.

10. A process for producing a hollow shaped article as it is defined in claim 1 by co-extrusion of molding compositions A and B.

11. A process for producing a hollow shaped article as it is defined in claim 1 by coextrusion or coextrusion blow molding of molding compositions A and B.

* * * * *

UNITED STATES PATENT AND TRADEMARK OFFICE
CERTIFICATE OF CORRECTION

PATENT NO.   : 6,254,949 B1
DATED        : July 3, 2001
INVENTOR(S)  : Glueck et al.

It is certified that error appears in the above-identified patent and that said Letters Patent is hereby corrected as shown below:

<u>Column 14, claim 9,</u>
Line 21, "the" should be -- they --.

Signed and Sealed this

Fifteenth Day of January, 2002

*Attest:*

*Attesting Officer*

JAMES E. ROGAN
*Director of the United States Patent and Trademark Office*